US012590921B2

(12) United States Patent
Jun et al.

(10) Patent No.: US 12,590,921 B2
(45) Date of Patent: Mar. 31, 2026

(54) RADIO FREQUENCY BIO SENSOR AND MANUFACTURING METHOD THEREOF

(71) Applicant: UIF (University Industry Foundation), Yonsei University, Seoul (KR)

(72) Inventors: Seong Chan Jun, Seoul (KR); Ji Sang Ha, Hanam-si (KR); Chae Kwang Im, Ansan-si (KR); Se Won Park, Seoul (KR); Tae Jong Hwang, Seoul (KR); Chan Woo Mun, Seoul (KR); Tae Wook Lee, Seoul (KR); Yun Ji Hwang, Seoul (KR); Shu De Liu, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 140 days.

(21) Appl. No.: 18/605,104

(22) Filed: Mar. 14, 2024

(65) Prior Publication Data

US 2024/0310316 A1     Sep. 19, 2024

(30) Foreign Application Priority Data

Mar. 15, 2023   (KR) ........................ 10-2023-0034054
Mar. 12, 2024   (KR) ........................ 10-2024-0034248

(51) Int. Cl.
*G01N 27/327* (2006.01)

(52) U.S. Cl.
CPC .............................. *G01N 27/3275* (2013.01)

(58) Field of Classification Search
CPC .......... G01N 27/3275; G01N 33/48707; G06F 30/394
See application file for complete search history.

(56) References Cited

PUBLICATIONS

IEEE, Electronic Components and Technology Conference; 2011 (Year: 2011).*
Biosensors and Bioelectronics 31, 2012, 349-356 (Year: 2012).*

* cited by examiner

*Primary Examiner* — Gurpreet Kaur
(74) *Attorney, Agent, or Firm* — NORTON ROSE FULBRIGHT US LLP

(57) ABSTRACT

Disclosed are an RF bio-sensor and a method for manufacturing the same, in which DNA may be detected in real time, which may greatly improve detection efficiency, and a relatively simple manufacturing method and detection method are used, and signal media materials can be reused, thus making it excellent in terms of economic efficiency, and the bio-sensor does not rely on enzymes or chemical reactions, but uses only high-frequency electrical signal analysis, thus not requiring labels and thus significantly reducing contamination problems.

11 Claims, 4 Drawing Sheets

RADIO FREQUENCY BIO SENSOR AND MANUFACTURING METHOD THEREOF

This application claims priority to and the benefit of Korean Application KR 10-2023-0034054, filed Mar. 15, 2023, and Korean Application KR 10-2024-0034248, filed Mar. 12, 2024. The contents of the referenced applications are incorporated into the present application by reference.

BACKGROUND

Field

The present disclosure relates to an RF (Radio Frequency) bio-sensor and a method for manufacturing the same. More specifically, the present disclosure relates to an RF bio-sensor capable of precise DNA detection in real time via a relatively simple detection process and method for manufacturing the same.

Description of Related Art

In general, nucleic acid analysis methods such as deoxy-ribonucleic acid (DNA) and ribonucleic acid (RNA) are used in many fields such as biological research, medical diagnosis, new drug discovery, and forensic medicine. In particular, various methods are being attempted to find DNA with a specific base sequence. As part of these efforts, DNA detection methods such as southern blotting, detection methods using DNA chips, laser-induced fluorescence (LIF), and surface plasmon resonance SPR) have been introduced. However, these conventional NDA detection methods have limitations in its use in various industries due to following problems.

First, in the southern blotting, DNA fragments separated according to a size are moved onto a solid substrate by electrophoresis and the relative positions of the DNA fragments are maintained, and then the DNA of the base sequence to be observed as labeled with a radioisotope as a probe is inserted into the DNA fragment fixed on a solid phase, and the probe binds to the DNA fragment that may bind thereto in a complementary manner through hybridization and, thus, the DNA with the target base sequence is detected. However, the southern blotting has the problem of requiring a lot of labor, skilled technology, a lot of inspection time, the presence of essential labels, easy contamination, and enormous resources.

Second, the DNA detection method using the DNA chip, which was introduced to overcome the above-mentioned problems includes arranging DNA fragments with very diverse base sequences at high density on a narrow substrate surface, and information about DNA in an unknown sample is found out through hybridization between the fixed DNA and the complementary DNA in the unknown sample. However, this DNA detection method using the DNA chip requires radiography to label the target DNA with a radioactive isotope in order to know the results of the DNA hybridization reaction. Since the analysis time takes about a day, the results cannot be known in real time, the resolution is low, and there are problems with the stability of radioactive isotopes, which limits its use in various industries.

Third, the recently introduced laser-induced fluorescence (LIF) method has the advantage of being able to use multiple fluorescent materials, has good resolution, and provides immediate results. The method includes labeling the sample's DNA with a fluorescent material, which is essential before measurement, and isolating and purifying the same.

However, this process is complicated and requires expensive equipment such as lasers and optical measurement accessories. Furthermore, an expensive image scanner is required to scan the two-dimensional substrate surface. Thus, there is a problem that the economic feasibility is very low because the scanner is inevitably necessary. In addition, the surface plasmon resonance SPR) is a method of detecting DNA binding without using a label. However, its sensitivity is not good and there are limitations in that detection of the DNA is possible only when the probe DNA is immobilized on the surface.

Accordingly, there is an urgent need to research a DNA detection method or a bio-sensor that may solve the problems of the conventional DNA detection methods and enable real-time sensing, excellent economic efficiency, and precise analysis.

PRIOR ART LITERATURE

Patent Document (Patent Document 1) Korean Patent No. 10-0386606 (2003 May 23)

SUMMARY

The present disclosure was designed to overcome the above-mentioned problems, and thus a purpose of the disclosure is to provide an RF bio-sensor and a method for manufacturing the same, in which DNA may be detected in real time, which may greatly improve detection efficiency, and a relatively simple manufacturing method and detection method are used, and signal media materials can be reused, thus making it excellent in terms of economic efficiency, and the bio-sensor does not rely on enzymes or chemical reactions, but uses only high-frequency electrical signal analysis, thus not requiring labels and thus significantly reducing contamination problems.

One aspect of the present disclosure to achieve the purpose provides a radio frequency (RF) bio-sensor for detecting DNA, the RF bio-sensor comprising: a silicon-based substrate; a signal detection electrode disposed on the silicon-based substrate and configured to generate an electric field under a voltage applied thereto; and an interconnector thin film disposed on the signal detection electrode and configured to transmit information on the DNA as a detection target to the signal detection electrode.

Furthermore, in accordance with one embodiment of the present disclosure, the substrate is a silicon-based substrate.

Furthermore, in accordance with one embodiment of the present disclosure, the interconnector thin film is a graphene oxide thin film.

Furthermore, in accordance with one embodiment of the present disclosure, a thickness of the interconnector thin film is in a range of 30 to 300 nm.

Furthermore, in accordance with one embodiment of the present disclosure, the signal detection electrode is a GSG (ground-signal-ground) type interdigital electrode.

Furthermore, in accordance with one embodiment of the present disclosure, the DNA as the detection target is plasmid DNA or genomic DNA.

Furthermore, in accordance with one embodiment of the present disclosure, the RF bio-sensor is configured to analyze a S-parameter using an input voltage and an output voltage of the signal detection electrode and to and measure a concentration of the DNA as the detection target based on the analysis result.

Furthermore, in accordance with one embodiment of the present disclosure, as the concentration of the DNA as the detection target decreases, a reflection parameter S11 and S22 and a resistance increase.

Furthermore, in accordance with one embodiment of the present disclosure, the RF bio-sensor further includes an input port and an output port.

Another aspect of the present disclosure to achieve the purpose provides a method for manufacturing a RF bio-sensor, the method comprising: a first step of forming a signal sensing electrode on a substrate; and a second step of forming an interconnector thin film so as to be in contact with the signal detection electrode, wherein the interconnector thin film transfers information about DNA as a detection target to the signal detection electrode.

Furthermore, in accordance with one embodiment of the present disclosure, the substrate is a silicon-based substrate.

Furthermore, in accordance with one embodiment of the present disclosure, the second step includes applying a graphene oxide solution on the signal detection electrode and then drying the applied graphene oxide solution to form a graphene oxide thin film.

The bio-sensor of the present disclosure enables real-time DNA detection, which may greatly improve detection efficiency. Furthermore, the bio-sensor of the present disclosure uses relatively simple manufacturing and detection methods, and reuses signal media materials, greatly improving economic feasibility. Furthermore, because the bio-sensor of the present disclosure uses only high-frequency electrical signal analysis without relying on enzymes or chemical reactions, it does not require labels, significantly reduces contamination problems, and allows for easy DNA detection without safety concerns.

DETAILED DESCRIPTIONS

Hereinafter, embodiments of the present disclosure will be described in detail so that those skilled in the art may easily perform the present disclosure. The present disclosure may be implemented in several different forms and is not limited to the embodiments as described herein.

As described above, the conventional method for detecting the DNA have limitations in their use in various industries due to uneconomical efficiency, long detection time, low resolution, stability issues, and complex detection processes. Accordingly, in order to solve the above problems, the present disclosure provides an RF (Radio Frequency) bio-sensor capable of detecting DNA, wherein the RF bio-sensor includes a silicon-based substrate; a signal detection electrode disposed on the silicon-based substrate and configured to generate an electric field under a voltage applied thereto; and an interconnector thin film disposed on the signal detection electrode and configured to transmit information on the DNA as a detection target to the signal detection electrode.

Thus, the bio-sensor of the present disclosure enables real-time DNA detection, which may greatly improve detection efficiency. Furthermore, the bio-sensor of the present disclosure uses relatively simple manufacturing and detection methods, and reuses signal media materials, greatly improving economic feasibility. Furthermore, because the bio-sensor of the present disclosure uses only high-frequency electrical signal analysis without relying on enzymes or chemical reactions, it does not require labels, significantly reduces contamination problems, and allows for easy DNA detection without safety concerns.

A RF bio-sensor 100 in accordance with the present disclosure is described with reference to the drawings below.

The RF bio-sensor 100 according to the present disclosure is an RF (Radio Frequency) bio-sensor capable of detecting DNA, wherein the RF bio-sensor 100 includes a silicon-based substrate 10, a signal detection electrode 20 disposed on the silicon-based substrate 10, and configured to generate an electric field under a voltage applied thereto, and an interconnector thin film 30 disposed on the signal detection electrode 20 and configured to transmit information on a DNA as a detection target to the signal detection electrode 20.

Figure 1:
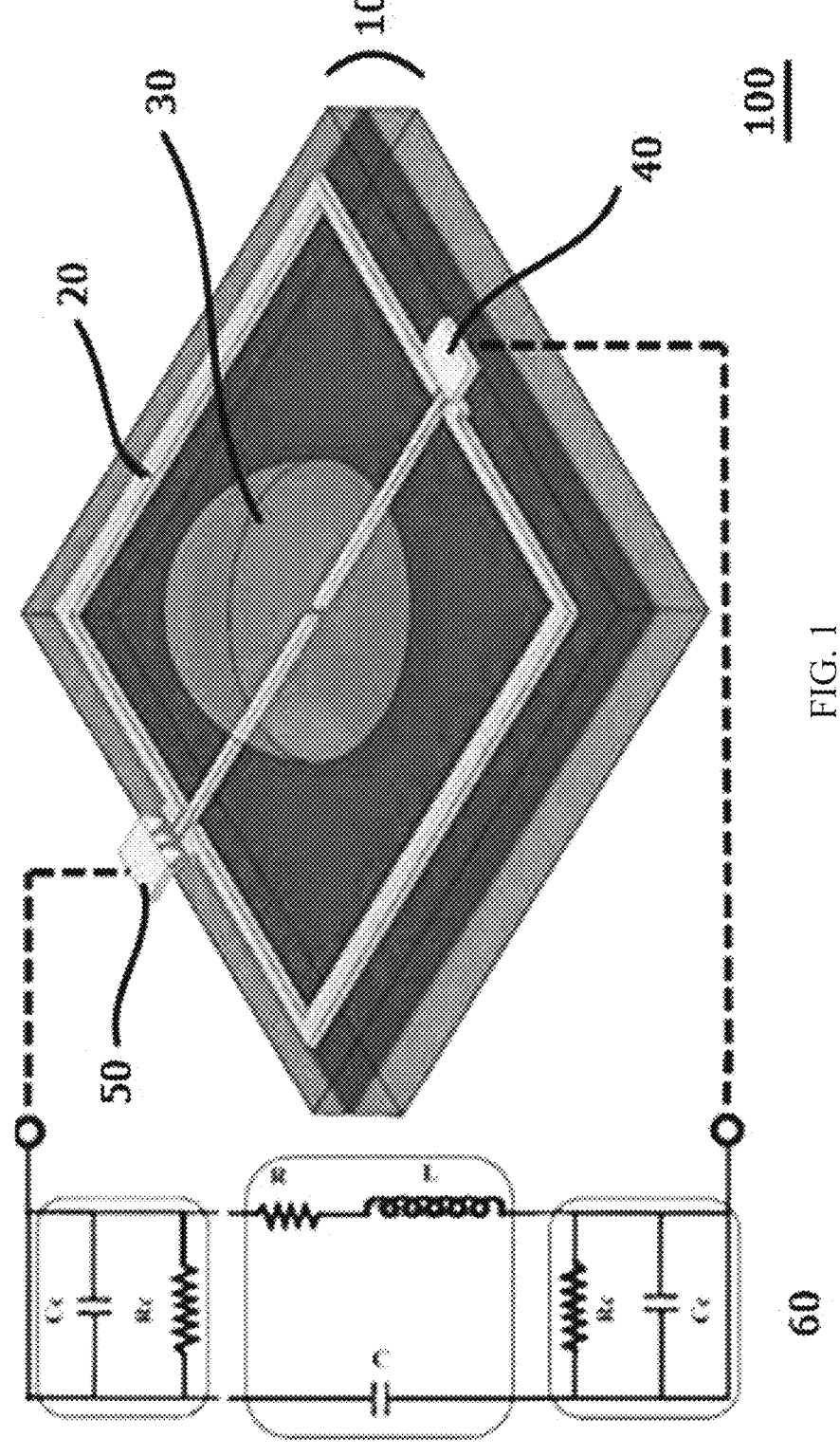
FIG. 1 is a schematic diagram showing an RF bio-sensor according to an embodiment of the present disclosure.

The silicon-based substrate 10 serves as a structural material to support the RF bio-sensor 100 according to the present disclosure and provides a space where the signal detection electrode 20 is deposited in one area thereof as shown in FIG. 1.

In this regard, the silicon-based substrate 10 may be used as a structural material of the bio-sensor that may detect DNA using a RF signal to meet the purpose of the present disclosure, and may be a silicon-based substrate with a conventional thickness that does not cause deterioration in electrical/optical characteristics. More preferably, the silicon-based substrate 10 may include a silicon-based wafer. Most preferably, the silicon-based substrate 10 may include a silicon-based substrate and silicon oxide ($SiO_2$) as thermally oxidized silicon as an upper layer on the substrate. This may maximize the signal while preventing leakage current.

Next, the signal detection electrode 20 is disposed on the silicon-based substrate 10, and includes portions spaced apart from each other so as to face each other to generate the electric field therebetween under the applied input/output power thereto, and is in contact with one area of the interconnector thin film 30. In this regard, the interconnector thin film 30 transfers the signal detected through the DNA as the detection target as an electrical optical signal to an input probe and an output probe disposed on one area of the silicon-based substrate 10 or the signal detection electrode 20.

For this purpose, the signal detection electrode 20 may be a ground-signal-ground (GSG) type interdigital electrode. That is, according to a preferred embodiment of the present disclosure, the signal detection electrode 20 may be the GSG type signal detection electrode having an electrode structure in which both opposing sides of the signal electrode are grounded, as shown in FIG. 1. In this case, this configuration may be more advantageous in that this configuration may measure a signal variation more sensitively than when using a conventional single electrode. Furthermore, according to a more preferred embodiment of the present disclosure, the signal detection electrode 20 may be a combination of the GSG type signal detection electrode and the interdigital electrode. The interdigital electrode may include a known and conventional conductive finger-like pattern. This pattern may include any suitable conductive material such as metals, semiconductors, doped semiconductors, semi-metals, metal oxides, organic conductors and conductive polymers, and mixtures thereof.

In this regard, the material that may be used for the signal detection electrode 20 may be a known common metal that meets the purpose of the present disclosure. Non-limiting examples thereof may include titanium (Ti) and gold (Au), chrome (Cr), etc. According to a preferred embodiment of the present disclosure, when the signal detection electrode 20 is the ground-signal-ground (GSG) type interdigital electrode, gold (Au) may be used as the material thereof. This may be advantageous in terms of electrical conductivity and sensitivity.

Next, the interconnector thin film 30 is disposed on the signal detection electrode 20 and serves as a signal mediating material that transfers information about the DNA as the detection target to the signal detection electrode 20.

That is, the interconnector thin film 30 has electrical characteristics changed when it receives light energy equal to or greater than a certain bandgap while a certain voltage is flowing through the signal detection electrode 20, and then transmits the changed electrical characteristics to a RF (Radiofrequency) analysis device which will be described later via the signal detection electrode 20. Then, the RF (Radiofrequency) analysis device may recognize migration of electrons from the valence band to the conduction band as an electrical signal and analyzes the electrical signal. Accordingly, the interconnector thin film 30 has a great influence on the analysis performance of DNA to be detected, such as reaction time, analysis time, and precise analysis. Thus, the interconnector thin film 30 may include a material having excellent electrical/optical characteristics and high stability and thus suitable for DNA analysis.

To this end, according to the present disclosure, the interconnector thin film 30 which transmits information about the DNA as the detection target to the signal detection electrode 20 may be a graphene oxide thin film.

In general, graphene is highly promising in many application fields such as electronics, energy storage and conversion Supercapacitors, batteries, fuel cells, solar cells) and biological science/biotechnology due to its unique physical properties such as a wide surface area, excellent thermal conductivity, electrical conductivity, and strong mechanical strength. Due to the unique chemical structure of graphene oxide made by oxidizing the graphene, graphene may be subjected to various chemical modifications or functionalization, making it useful for electrochemical or biomedical applications.

In this regard, according to the preferred embodiment of the present disclosure, when the interconnector thin film 30 is made of the graphene oxide, a thickness of the interconnector thin film may be in a range of 30 to 300 nm. In this regard, when the thickness of the interconnector thin film is smaller than 30 nm, there may be a problem in that the graphene thin film is not formed uniformly because it is generally thinner than the electrode. Additionally, when the thickness of the interconnector thin film exceeds 300 nm, there may be a problem of reduced signal change sensitivity due to binding to DNA.

The RF bio-sensor 100 according to the present disclosure may further include an input port 40 and an output port 50 respectively disposed on one area of the substrate 10 and one area of the signal detection electrode 20.

The input port 40 and the output port 50 are respectively disposed on one area of the silicon-based substrate 10 and one area of the signal detection electrode 20 and are electrically connected to the RF analysis device (not shown) and apply the RF signal to the RF analysis device (not shown) such that the RF analysis device (not shown) may measure a S-parameter using the electrical signal that changes depending on the DNA as the detection target in contact with the interconnector thin film 30.

More specifically, the RF bio-sensor 100 according to the present disclosure may measure the S-parameter using respective input and output voltages of the input port 40 and the output port 50. The S-parameter refers to a ratio of voltages respectively reflected and transmitting from and through the input port 40 and the output port 50, and includes a reflection parameter S11 using signals respectively reflected from the input port 40 and the output port 50, and a transmission parameter S21 using a signal transmitted from the input port 40 to the output port 50 and a signal transmitted from the output port to the input port.

In other words, according to the present disclosure, the reflection parameter S11 and the transmission parameter S21 may be used to calculate resistance R, inductance L, conductance G, capacitance C, impedance Z, and propagation constant y. In this regard, the R, L, G, and C (resistance, inductance, conductance, capacitance) and Z and y may be calculated based on a following in Equation 1.

$$\begin{bmatrix} A & B \\ C & D \end{bmatrix} = \frac{1}{2S_{21}} \begin{bmatrix} \left(1 - S_{11}^2 + S_{21}^2\right) & Z_0\left(\left(1 + S_{11}^2\right)^2 - S_{21}^2\right) \\ \frac{1}{Z_0}\left(\left(1 - S_{11}^2\right)^2 - S_{21}^2\right) & \left(1 - S_{11}^2 + S_{21}^2\right) \end{bmatrix} \quad \text{[Equation 1]}$$

$$\gamma = \cosh^{-1} A = \sqrt{(R + j\omega L)(G + j\omega C)}$$

$$Z = \sqrt{\frac{B}{C}} = \sqrt{(R + j\omega L)/(G + j\omega C)}$$

$$R = \text{Re}\,\{\gamma Z\} \quad L = \text{Im}\,\frac{\{\gamma Z\}}{\omega}$$

$$G = \text{Re}\,\{\gamma/Z\} \quad C = \text{Im}\,\{\gamma/Z\}/\omega$$

In this regard, $Z_0$ means an impedance of an empty space, and Re and Im are real and imaginary parts, respectively.

Figure 2:
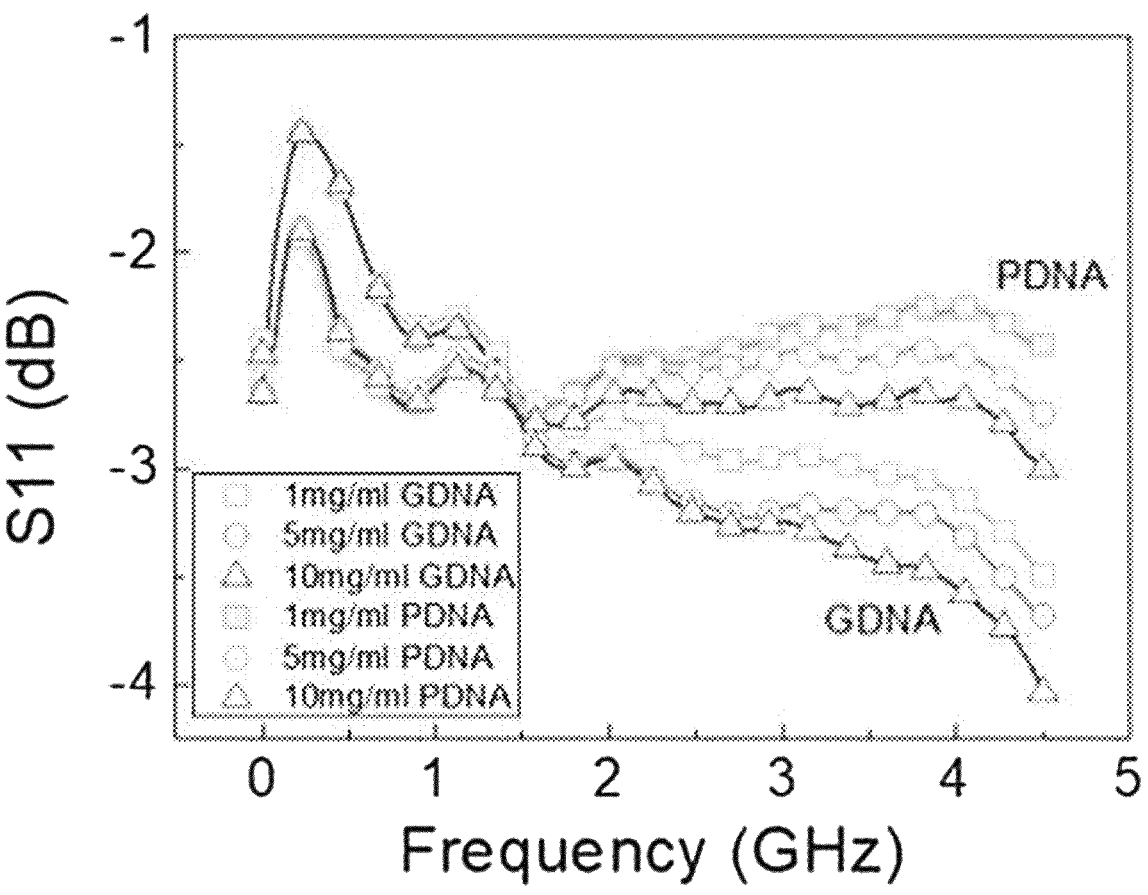
FIG. 2 is a graph showing a reflection parameter based on each of GDNA and PDNA concentrations according to one embodiment of the present disclosure.

Referring to FIG. 2, where the reflection parameter S11 was measured using the signals reflected from the input port 40 and the output port 50, respectively, based on the Equation 1 according to an embodiment of the present disclosure. According to an embodiment of the present disclosure, it may be identified that when the DNA as the detection target is each of genomic DNA and plasmid DNA, the reflection parameter changes depending on a concentration thereof. In other words, it may be identified that the lower the concentration of each of the genomic DNA and the plasmid DNA in PBS, the higher the reflection parameter.

Figure 3:
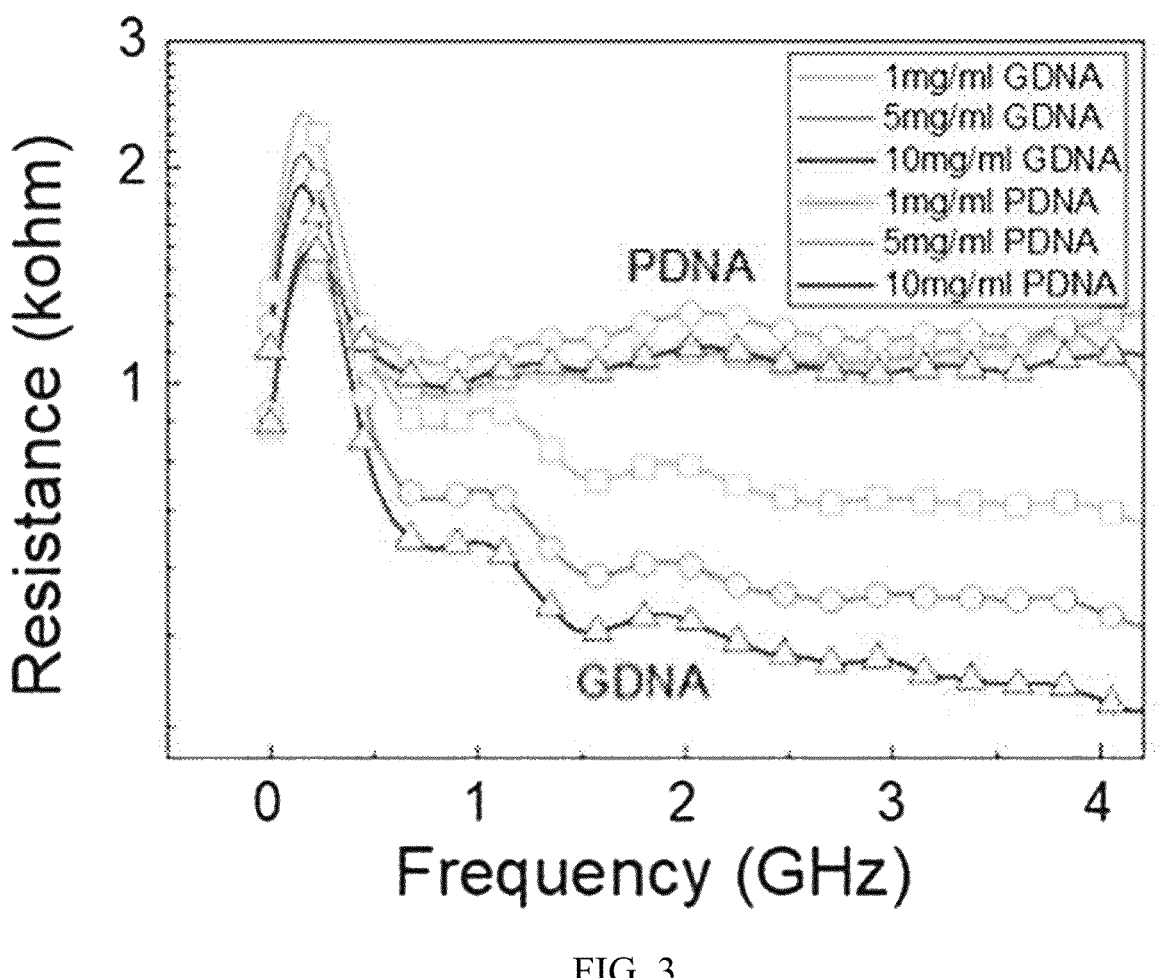
FIG. 3 is a graph showing resistance based on a concentration of each of GDNA and PDNA according to one embodiment of the present disclosure.

Further, referring to FIG. 3, according to an embodiment of the present disclosure, it may be identified that when the DNA as the detection target is each of the genomic DNA and the plasmid DNA, the resistance changes depending on the concentration of each of the genomic DNA and the plasmid DNA. In other words, it may be identified that the lower the concentration of each of the genomic DNA and the plasmid DNA in PBS, the higher the resistance.

Figure 4:
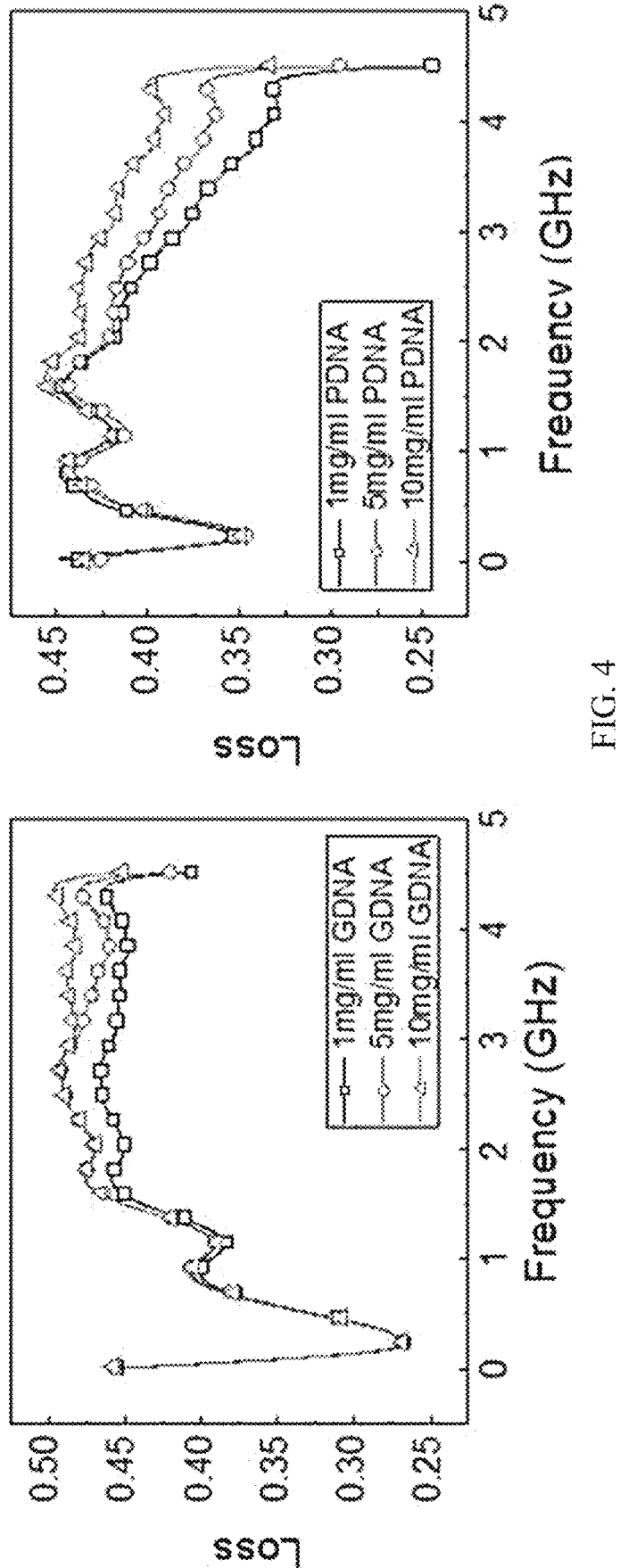
FIG. 4 is a graph showing loss analysis based on a concentration of each of GDNA and PDNA according to one embodiment of the present disclosure.

Likewise, referring to FIG. 4, according to one embodiment of the present disclosure, it may be identified that when the DNA as the detection target is each of the genomic DNA and the plasmid DNA, the loss changes based on the concentration thereof. In other words, it may be identified that the higher the concentration of each of the genomic DNA and the plasmid DNA in PBS, a higher the loss.

The RF bio-sensor 100 according to the present disclosure includes the silicon-based substrate 10, the signal detection electrode 20 disposed on the silicon-based substrate 10, and configured to generate an electric field under a voltage applied thereto, and the interconnector thin film 30 disposed on the signal detection electrode 20 and configured to transmit information on a DNA as a detection target to the signal detection electrode 20. More preferably, the graphene oxide thin film may be used as the interconnector thin film 30. The DNA as the detection target may be the plasmid DNA or the genomic DNA. Thus, the DNA may be easily detected without concerns about safety by using only high-frequency electrical signal analysis without relying on enzymes or chemical reactions.

Further, the present disclosure provides the RF bio-sensor 100 and the RF (Radio frequency) analysis device (not shown) that is electrically connected to the RF bio-sensor 100 and analyzes the S-parameter based on the DNA to be detected and analyzes the base sequence of the DNA as the detection target based on the analysis result.

The RF analysis device may be electrically connected to the RF bio-sensor 100 via the input port 40 and the output port 50 formed on the signal detection electrode 20 disposed on the silicon-based substrate 10 of the RF bio-sensor 100 as described above. The input port 40 and the output port 50 may contact a probe (not shown) of the device.

The RF analysis device may apply the RF signal to the signal detection electrode 20 and may measure the RF signal generated from the interconnector thin film 30 disposed on the silicon-based substrate 10 in response to the RF signal. Afterwards, the measured RF signal may be transmitted from the RF analysis device to a control device (not shown). Alternatively, the RF analysis device may measure the S-parameter based on the RF signal and transmit the measured S-parameter to the control device (not shown).

Accordingly, the control device may include an input unit, a communication unit, a display unit, a memory, and a processor that transmit the RF signal or measure the S-parameter based on the RF signal.

The input unit may include at least one input means. Non-limiting example thereof may include a keyboard, a key pad, a dome switch, a touch panel, a touch key, a mouse, a menu button, etc.

The communication unit may perform communication with an external device such as the RF analysis device to receive data therefrom. For example, the communication unit may perform communications under 5th generation communication (5G), long term evolution-advanced (LTE-A), long term evolution (LTE), and wireless fidelity (Wi-Fi).

The display unit may display the display data according to the operation of the analysis device. The display data may include, for example, a screen for inputting input data, a screen for displaying analysis progress, and a screen for displaying analysis results. Any display data related to a wavelength and an intensity of light may be applied without limitation. The display units may include liquid crystal displays (LCD), light-emitting diode (LED) displays, organic light-emitting diode (OLED) displays, micro electro mechanical system (MEMS) displays, and electronic paper displays.

The memory may include a non-volatile storage that may store therein operation programs of the analysis device and maintain data (information) regardless of whether power is provided or not, and a volatile memory to which data to be processed by the processor is loaded, and which cannot retain the data unless power is provided thereto.

The processor may execute software such as a program to control at least one of the other components (e.g., hardware or software components) of the analysis device, and may perform various data processing or calculations.

Next, a method for manufacturing the RF bio-sensor according to the present disclosure is described. However, to avoid duplication, descriptions of portions that have the same technical idea as that of the RF bio-sensor 100 as described above are omitted.

The method for manufacturing the RF bio-sensor according to the present disclosure includes a first step of forming a signal detection electrode on a silicon-based substrate, and a second step of forming an interconnector thin film that transfers information on the DNA as a detection target to the signal detection electrode so as to be in contact with the signal detection electrode.

The first step in the method for manufacturing an RF bio-sensor according to the present disclosure is to form the signal detection electrode on the silicon-based substrate.

In this regard, the silicon-based substrate may be manufactured by a known conventional silicon-based substrate manufacturing method as long as it meets the purpose of the present disclosure. For example, an upper layer of the silicon-based substrate having a thickness of 100 to 1000 μm and an area size of 3 to 30 mm is subjected to a thermal oxidation process at a temperature of 800 to 1200° C. for about 30 minutes and thus is converted to a silicon oxide ($SiO_2$) layer. The upper surface of the silicon-based substrate may be oxidized into the silicon oxide ($SiO_2$) layer. This may be advantageous in that the silicon oxide layer may reduce leakage current and maximize only the RF signal compared to the general silicon-based substrate.

The signal detection electrode may also be formed on the substrate by a known conventional signal detection electrode formation method as long as it meets the purpose of the present disclosure. For example, the signal detection electrode may be deposited on the silicon oxide layer via photolithography. In this regard, the electrode may be deposited via sputtering using a chrome photomask.

In this regard, the signal detection electrode 20 may be the ground-signal-ground (GSG) type interdigital electrode as described above. The material thereof may be a known and common metal that meets the purpose of the present disclosure. The non-limiting example thereof may include titanium (Ti), gold (Au), chromium (Cr), etc. Preferably, gold (Au) may be used. This may be advantageous in terms of electrical conductivity and sensitivity.

Next, the second step in the method for manufacturing the RF bio-sensor according to the present disclosure is a step of forming an interconnector thin film that transfers information of the DNA as a detection target to the signal detection electrode so as to be in contact with the signal detection electrode. In this regard, the second step may be a step of applying a graphene oxide solution onto the signal detection electrode and drying the applied solution to form the graphene oxide thin film.

Hereinafter, the present disclosure will be described in more detail through examples. However, the following examples do not limit the scope of the present disclosure, and should be interpreted to aid understanding of the present disclosure.

Example—Manufacturing of Rf Bio-Sensor

A silicon oxide ($SiO_2$) substrate with a thickness of approximately 675 μm and an area size of 9*9 mm was manufactured through a thermal oxidation process at approximately 1000° C.

Afterwards, the photolithography process including photoresist coating, soft bake, exposure, and development was performed thereon. A chrome (Cr) photomask was used as the mask, and titanium (Ti) and gold (Au) were deposited thereon via sputtering to form the GSG type interdigital electrode on the substrate. Afterwards, a graphene solution (Sigma Aldrich) produced through the usual Himmer's method was purchased, and 3 µℓ thereof was applied on the GSG type interdigital electrode and dried sufficiently to manufacture a final RF bio-sensor with a 170 nm of the graphene oxide thin film.

Experimental Example 1—Reflection Parameter Analysis Based on GDNA and PDNA Concentrations The reflection parameter analysis was performed on the above RF bio-sensor of the above example based on each of the GDNA and PDNA concentrations and is shown in FIG. 2.

Referring to FIG. 2, according to one embodiment of the present disclosure, it may be identified that when the DNA as the detection target is each of the genomic DNA and the plasmid DNA, the reflection parameter changes depending on the concentration thereof. In other words, it may be identified that the lower the concentration of each of the genomic DNA and the plasmid DNA in PBS, the higher the reflection parameter.

Experimental Example 2—Resistance Analysis Depending on Concentration of Each of GDNA and PDNA Resistance analysis was performed on the above RF bio-sensor of the above example depending on the concentration of each of GDNA and PDNA and is shown in FIG. 3.

Referring to FIG. 3, according to one embodiment of the present disclosure, it may be identified that when the DNA as the detection target is each of the genomic DNA and the plasmid DNA, the resistance changes depending on the concentration of each of the genomic DNA and the plasmid DNA. In other words, it may be identified that the lower the concentration of each of the genomic DNA and the plasmid DNA in PBS, the higher the resistance.

Experimental Example 3—Loss Analysis Based on Concentration of Each of GDNA and PDNA Loss analysis was performed on the above RF bio-sensor of the above example based on a concentration of each of GDNA and PDNA and is shown in FIG. 4.

Referring to FIG. 4, according to one embodiment of the present disclosure, it may be identified that when the DNA as the detection target is each of the genomic DNA and the plasmid DNA, the loss is higher as the concentration thereof increases. In other words, according to the present disclosure, the concentration of each of the genomic DNA and the plasmid DNA may be obtained based on the loss value.

What is claimed is:

1. An apparatus, comprising:
a radio frequency (RF) bio-sensor for detecting DNA, the RF bio-sensor comprising:
   a substrate;
   a signal detection electrode disposed on the substrate and configured to generate an electric field under a voltage applied thereto; and
   an interconnector thin film disposed on the signal detection electrode and configured to transmit information on the DNA as a detection target to the signal detection electrode; and
a RF analysis device coupled to the RF bio-sensor and configured to:
   determine a first scattering parameter (S-parameter) and a second S-parameter based on an input voltage and an output voltage of the signal detection electrode; and
   determine a concentration of the DNA as the detection target based on the first S-parameter and the second S-parameter.

2. The apparatus of claim 1, wherein the substrate of the RF bio-sensor is a silicon-based substrate.

3. The apparatus of claim 1, wherein the interconnector thin film of the RF bio-sensor is a graphene oxide thin film.

4. The apparatus of claim 1, wherein a thickness of the interconnector thin film of the RF bio-sensor is in a range of 30 to 300 nm.

5. The apparatus of claim 1, wherein the signal detection electrode of the RF bio-sensor is a GSG (ground-signal-ground) type interdigital electrode.

6. The apparatus of claim 1, wherein the DNA as the detection target is plasmid DNA or genomic DNA.

7. The apparatus of claim 1, wherein as the concentration of the DNA as the detection target decreases, the first S-parameter increases, the second S-parameter decreases, and a resistance of the RF bio-sensor increases.

8. The apparatus of claim 1, wherein the RF bio-sensor further includes an input port and an output port, wherein the input voltage is applied to the input port and the output voltage is measured at the output port, wherein the first S-parameter represents a ratio of a reflected voltage measured at the input port to the input voltage, and wherein the second S-parameter represents a ratio of the output voltage to the input voltage.

9. The apparatus of claim 8, wherein the input port is disposed on an end of the substrate of the RF bio-sensor and the output port is disposed on an end of the signal detection electrode of the RF bio-sensor.

10. The apparatus of claim 1, wherein the RF analysis device is further configured to:
   determine a first coefficient, a second coefficient, a third coefficient, and a fourth coefficient based on the first S-parameter and the second S-parameter;
   determine an impedance based on the second coefficient and the third coefficient; and
   determine the concentration of the DNA as the detection target based on the impedance.

11. The apparatus of claim 10, wherein the RF analysis device is further configured to determine a propagation constant based on the first coefficient.

* * * * *